UNITED STATES PATENT OFFICE.

AUGUST R. MEYER, OF KANSAS CITY, MISSOURI; EMMA J. MEYER, EXECUTRIX OF SAID AUGUST R. MEYER, DECEASED, ASSIGNOR TO THE UNITED ZINC & CHEMICAL COMPANY, OF KANSAS CITY, MISSOURI, A CORPORATION OF NEW JERSEY.

EXTRACTION OF PRECIOUS METALS FROM ZINC ORES.

No. 815,614.      Specification of Letters Patent.      Patented March 20, 1906.

Application filed July 22, 1905. Serial No. 270,809.

*To all whom it may concern:*

Be it known that I, AUGUST R. MEYER, a citizen of the United States, residing at Kansas City, in the county of Jackson and State of Missouri, have invented certain new and useful Improvements in the Extraction of Precious Metals from Zinc Ores, of which the following is a specification.

In the ordinary practice of recovering precious metals which are contained in limited quantities in zinc ores from which the zinc is extracted it is common to secure the zinc by sublimation from the ore and to extract the precious-metal contents from the residual matter in the retorts by a subsequent treatment in special furnaces, making use of lead or copper for separating such metals from the slag.

In order to avoid the expense and other objections to the double treatment above described, my invention consists in combining with the pulverized zinc ore copper in a comminuted form and intimately mixed with the ore, being either in a metallic form or an oxid or any of the salts, and preferably in the form of ores containing copper, care being taken to insure a thorough admixture of the copper throughout the mass of zinc ore. This mass is then placed in a retort with a proper reducing material—as, for instance, carbonaceous matter—which aids in reducing the zinc from the oxid on the application of heat, which first drives off the zinc in the form of fumes, which are subsequently condensed and collected, as usual, while the copper acts directly upon the precious-metal contents of the charge, extracting the same and combining therewith, forming a product either of metallic regulus or sulfids, forming matte, which may either gather in a mass or, as is more usually the case, collect in globules throughout the charge in the retort.

After the distillation of the zinc the metallic portions or matte containing the precious metals may be readily separated from the earthy constituents of the retort residues and may then be treated to recover the precious metal from the metal—that is, copper—used for its extraction.

By the above-described process I secure the recovery of zinc contained in the ore by the usual process, and at the same time secure the extraction of the precious metals all by a single operation, whereas heretofore after the recovery of the zinc by the usual methods it was necessary to subject the entire mass of residues to special processes for the recovery of the precious metals therein contained. It is also to be observed that I utilize the heat required in the process for the distillation of zinc, and which is therefore without expense available to bring about the extraction of the precious metals, or, more correctly speaking, the combination of the same with metals used for their extraction.

While I have referred to copper as the metal employed, lead will secure a like result, or an ore containing copper or lead, which in the process described are the equivalents of copper.

Without limiting myself to the use of any special proportions or character of apparatus, I claim as my invention—

1. The within-described process of recovering zinc and precious metals from zinc ores, the same consisting in forming an intimate mixture of comminuted ore and copper, and heating the mass to sublimate the zinc and form a matte or regulus containing the precious metal and the copper, and then separating the matte or regulus containing the precious metal from the residue, and condensing the zinc fumes, substantially as set forth.

2. In the process of recovering precious metals from zinc ores, mixing together the comminuted ore and metallic copper, and heating the mass to sublimate the zinc and form a metallic regulus or matte containing the precious metal, substantially as set forth.

In testimony whereof I have signed my name to this specification in the presence of two subscribing witnesses.

AUGUST R. MEYER.

Witnesses:
   CHARLES E. FOSTER,
   G. P. KRAMER.